United States Patent [19]

Miller

[11] Patent Number: 5,361,861

[45] Date of Patent: Nov. 8, 1994

[54] POWER STEERING SYSTEM

[75] Inventor: Laurence L. Miller, W. Lafayette, Ind.

[73] Assignee: TRW Inc., Lyndhurst, Ohio

[21] Appl. No.: 11,399

[22] Filed: Jan. 29, 1993

[51] Int. Cl.⁵ ........................................... G62D 5/06
[52] U.S. Cl. ............................... 180/132; 91/375 A; 180/149; 267/277
[58] Field of Search ............... 180/132, 141, 145, 149, 180/151; 267/154, 157, 277; 74/388 PS; 91/375 A; 464/97

[56] References Cited

U.S. PATENT DOCUMENTS

| | | | |
|---|---|---|---|
| 3,118,660 | 1/1964 | Saniewski | 267/154 |
| 3,709,099 | 6/1973 | Dumeah | 91/54 |
| 4,557,342 | 12/1985 | Drutchas | 180/132 |
| 4,598,787 | 7/1986 | Drutchas | 180/79.1 |
| 4,632,204 | 12/1986 | Honaga | 91/375 A |
| 4,774,847 | 10/1988 | Breitweg | 180/132 |
| 4,942,803 | 7/1990 | Rabe et al. | 91/370 |
| 5,251,669 | 10/1993 | Bishop | 137/625.23 |

FOREIGN PATENT DOCUMENTS

| | | | |
|---|---|---|---|
| 0468659 | 1/1992 | European Pat. Off. | 180/132 |
| 0106177 | 5/1988 | Japan | 180/132 |

Primary Examiner—Margaret A. Focarino
Assistant Examiner—Anne Marie Boehler
Attorney, Agent, or Firm—Tarolli, Sundheim & Covell

[57] ABSTRACT

A power steering system includes a pair of valve members (42, 46) which are interconnected by a torsion-tension spring (52). During a steering maneuver, torque is applied to the torsion-tension spring (52) to effect increasing torsional deformation of the torsion-tension spring. Tensile force is also applied to the torsion-tension spring (52) to effect increasing axial deformation of the torsion-tension spring. The tensile force is applied to the torsion-tension spring (52) by interaction between rollers (110) of a thrust bearing (80) and annular arrays (84, 92) of cam surfaces (86, 94) which engage opposite sides of the rollers. The cam surfaces (86, 94) are connected with opposite ends of the torsion-tension spring (52) by rigid bodies(42, 62, 102, 76) so that any increase in the distance between the cam surfaces results in a corresponding elongation of the torsion-tension spring. The cam surfaces (86, 94) have a configuration such that the extent of axial deformation of the torsion-tension spring (52) during each increment of relative rotation decreases. This results in a decrease in the force required to effect each succeeding increment of axial deformation of the torsion-tension spring (52).

14 Claims, 7 Drawing Sheets

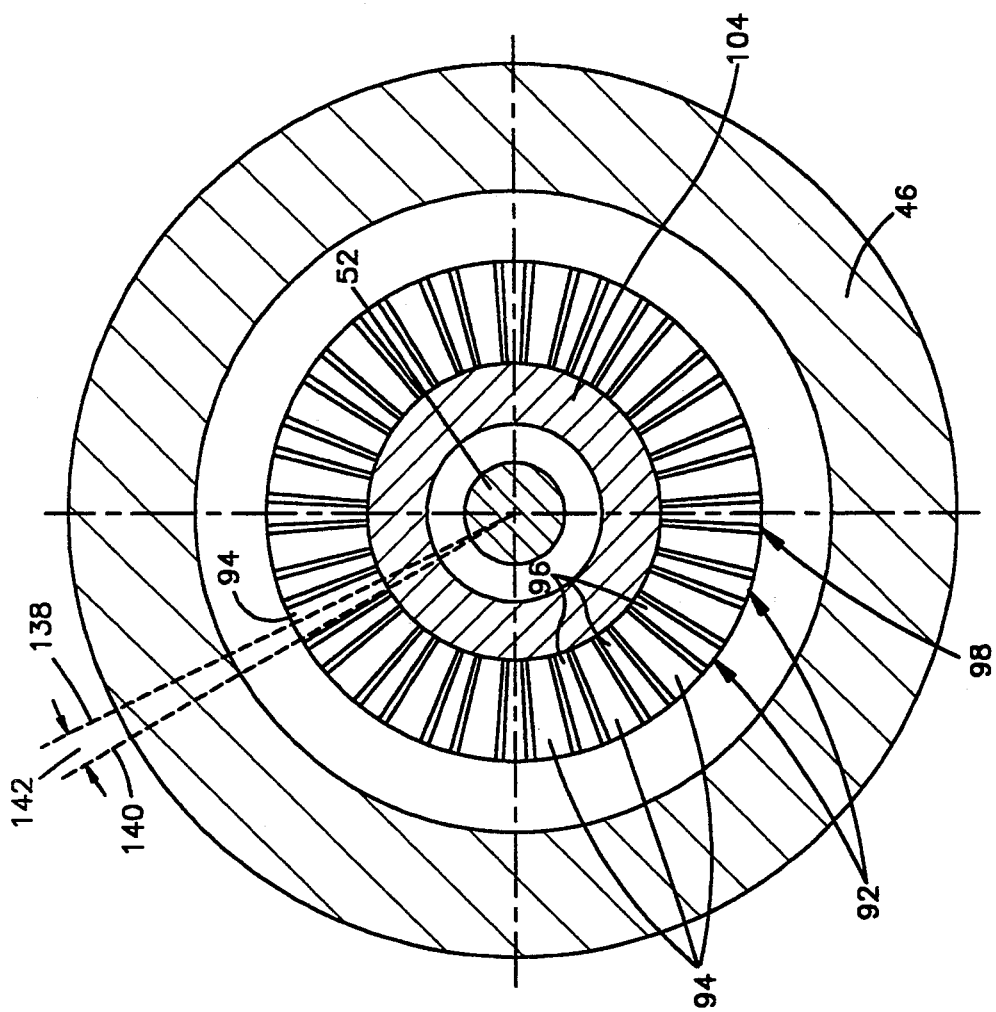
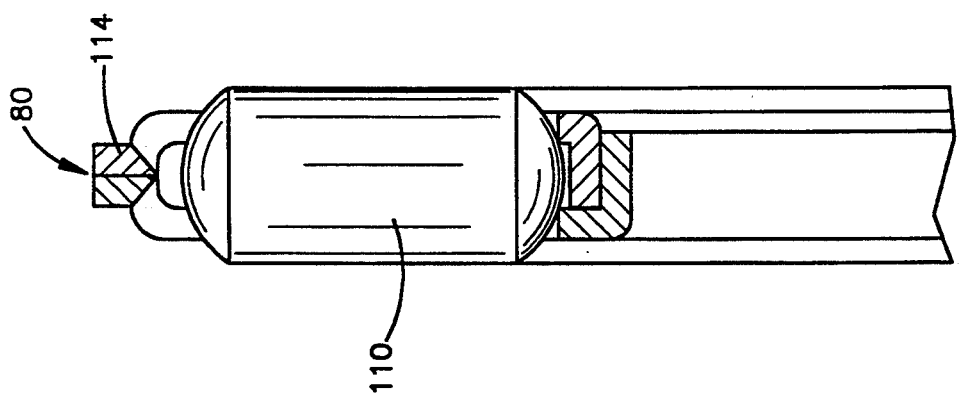

POWER STEERING SYSTEM

BACKGROUND OF THE INVENTION

The present invention relates to a new and improved hydraulic control valve for a hydraulic power steering system and more specifically to a hydraulic control valve having a torsion-tension spring that resists relative rotation between a pair of valve members.

In a known power steering system, a torsion bar is utilized to interconnect a pair of relatively rotatable hydraulic valve members. When a steering maneuver is made, the torsion bar is subjected to torsional, elastic deformation. As the torsion bar is elastically deformed, the valve members are rotated relative to each other. Relative rotation between the valve members allows pressurized hydraulic fluid flow from a pump to a hydraulic power steering motor connected between the frame of the vehicle and the steerable wheels to effect operation of the power steering motor and steering of the vehicle. Power steering systems in which a torsion bar is subjected to torsional deformation, are disclosed in U.S. Pat. Nos. 3,709,099; 4,557,342 and 4,598,787.

During operation of a vehicle, it is desirable to have a force which biases the hydraulic valve of a steering system to a neutral, non-steering condition when operator input steering torque is low or nonexistent. It is also desirable to have the amount of manual input torque required to turn the steerable vehicle wheels to be comparable whether a parking maneuver is made when the vehicle is stationary or operating at very low speeds or in a lane change maneuver at 55 miles per hour. However, the amount of torque which a driver of a vehicle must input to the steering system is approximately 240% greater during steering in a parking maneuver than during a lane change maneuver when a vehicle is moving at 55 miles per hour. Torsion bar springs have essentially linear spring rates, and provide a torque biasing the hydraulic control valve toward an on center condition which is the product of angular displacement multiplied times the spring rate. It is desirable to provide a preload to prevent angular displacement of the torsion bar until the input torque reaches a predetermined minimum level.

SUMMARY OF THE INVENTION

The present invention relates to a new and improved torsion-tension spring apparatus for use in a hydraulic power steering system. The apparatus includes a pair of hydraulic valve members which are rotatable relative to each other to control operation of a power steering motor. A torsion-tension spring resiliently interconnects the hydraulic valve members.

Upon initiation of a steering operation, torque is applied to the torsion-tension spring to effect torsional and axial deformation of the torsion-tension spring. In order to require a similar amount of effort to effect either a parking maneuver or a relatively high speed lane change, the incremental axial deformation of the torsion-tension spring with each increment of relative rotation between the valve members decreases as the extent of angular displacement of the torsion-tension spring increases throughout at least a portion of the range of relative rotation between the members.

A tensile force is applied to the torsion-tension spring by cam surfaces which engage opposite sides of bearing elements. Relative rotation between the cam surfaces results in the transmission of tensile forces through rigid bodies to opposite end portions of the torsion-tension spring to effect axial elongation of the torsion-tension spring. The cam surfaces have a configuration such that during at least a portion of the relative rotation between the cam surfaces, each succeeding increment of relative rotation results in the torsion-tension spring being axially deformed to a lesser extent than on the preceding increment of relative rotation between the cam surfaces.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 5 is a sectional view, taken generally along the line 5—5 of FIG. 2;

FIG. 6 is an enlarged fragmentary view of a portion of a thrust bearing assembly used in the apparatus of FIGS. 1 and 2;

DESCRIPTION OF A PREFERRED EMBODIMENT OF THE INVENTION

General Description

Figure 1:
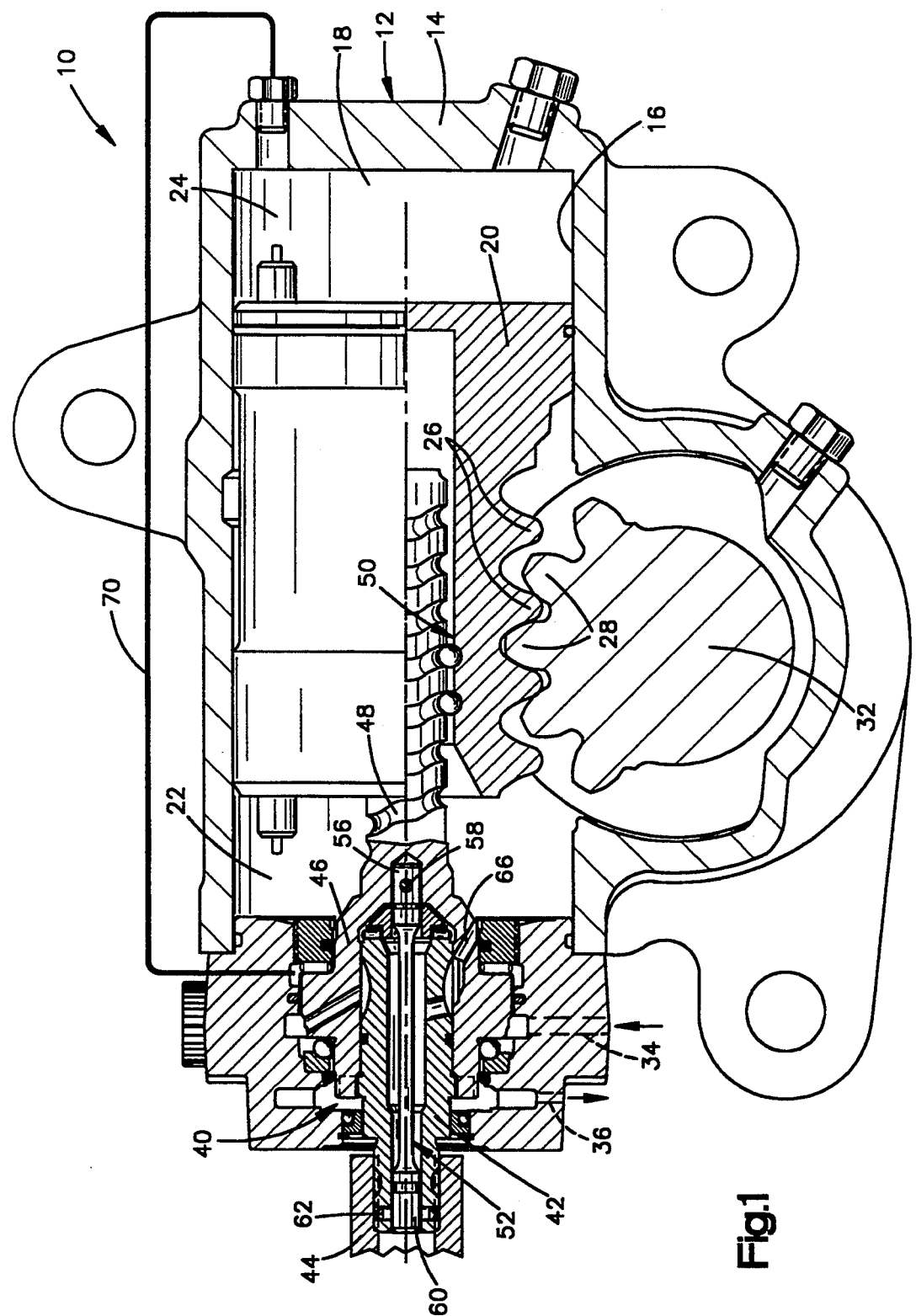
FIG. 1 is a sectional view of a power steering system constructed in accordance with the present invention.

A power steering system 10 (FIG. 1) is used to turn steerable wheels (not shown) of a vehicle. The power steering system 10 includes the elements required to convert a pressurized hydraulic fluid energy into a mechanical output torque. One of the elements is a hydraulic power steering motor 12. The power steering motor 12 includes a housing 14 having a cylindrical inner surface 16 defining a chamber 18. A piston 20 divides the chamber 18 into left and right (as viewed in FIG. 1) end portions 22 and 24.

A plurality of rack teeth 26 are formed on the piston 20. The rack teeth 26 mesh with sector gear teeth 28. The sector gear teeth 28 are disposed on an output shaft 32 which is connected with the steerable vehicle wheels by a suitable steering linkage (not shown). Movement of the piston 20 in the chamber 18 rotates the output shaft 32 to operate the steering linkage in a known manner.

The housing 14 has a fluid inlet port 34 connected with a pump or other source of hydraulic fluid under pressure. The housing 14 also has an outlet port 36 which is connected with reservoir.

A directional control valve assembly 40, constructed in accordance with the present invention, controls the direction of operation of the power steering motor 12. The directional control valve assembly 40 includes a valve core or member 42 connected with a rotatable input shaft 44. The input shaft 44 is rotated by manual rotation of a vehicle steering wheel. The valve core 42 is telescopically received in a valve sleeve or member 46. The valve sleeve 46 is connected with an externally threaded follow-up shaft 48. The follow-up shaft 48 is connected with the piston 20 by a ball nut 50.

The valve core 42 and valve sleeve 46 are interconnected by a torsion-tension spring 52. An inner end portion 56 of the torsion-tension spring 52 is connected with the valve sleeve 46 by a pin 58. An outer end portion 60 of the torsion-tension spring 52 is connected with the valve core 42 by a pin 62. The torsion-tension spring 52 has a configuration corresponding to the configuration of a known torsion bar.

An outlet passage 66 formed in the valve sleeve 46 connects the interior of the valve sleeve 46 in fluid communication with the left end portion 22 of the power steering motor chamber 18. Another passage (not shown) formed in the valve sleeve 46 connects the interior of the valve sleeve in fluid communication with the right end portion of the motor cylinder chamber 18 through a housing passage 70.

The power steering system 10 has the same construction as is disclosed in U.S. Pat. No. 4,942,803. However, the power steering system could have a construction which is different from the construction illustrated in FIG. 1. For example, the power steering system may be of the rack and pinion type disclosed in U.S. Pat. No. 3,709,099. If desired, electrically actuated valves may be utilized to control fluid flow to a power steering motor in the manner disclosed in U.S. Pat. No. 4,557,342. Alternatively, the power steering system could include an electrical steering assist motor in the manner disclosed in U.S. Pat. No. 4,598,787.

Torsion and Tensile Force Applicator Assembly

In accordance with a feature of the present invention, a torsion and tensile force applicator assembly 74 (FIG. 2) is utilized to apply tensile force to the torsion-tension spring 52. The assembly 74 is connected with the inner and outer end portions 56 and 60 of the torsion-tension spring 52 through rigid metal bodies. Thus, the assembly 74 is connected with the inner end portion 56 of the torsion-tension spring by a metal clip 76 and by the rigid metal valve sleeve 46. The valve sleeve 46 is connected with the inner end portion 56 of the torsion-tension spring 52 by the rigid metal pin 58. The assembly 74 is connected with the outer end portion 60 of the torsion-tension spring 52 through the rigid valve core 42 and rigid metal pin 62 (FIG. 2).

The torsion and tensile force applicator assembly 74 includes an annular thrust bearing assembly 80. The thrust bearing assembly 80 is disposed between an annular outer array 84 (FIG. 3 and 4) of identical cam surfaces 86. The cam surfaces 86 are separated by flat radially extending lands 88. In the illustrated embodiment of the invention, the cam surfaces 86 are formed on the axially inner end portion of the rigid metal valve core 42. However, if desired, the cam surfaces 86 and lands 88 could be formed on an annular member or washer which is fixedly secured to the inner end portion of the valve core 42.

Figure 3:
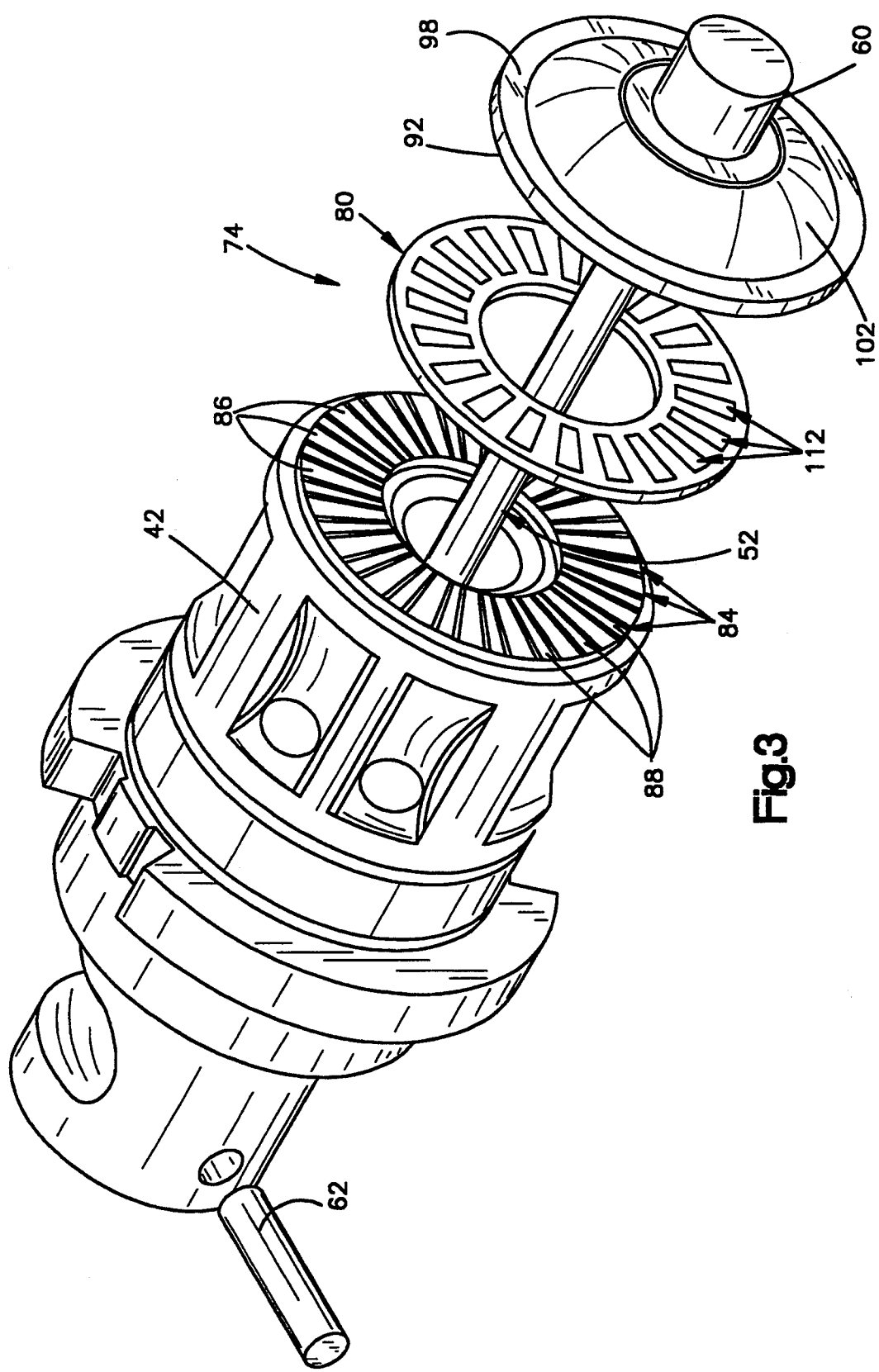
FIG. 3 is an exploded view of some of the components of the apparatus of FIG. 2.
Figure 4:
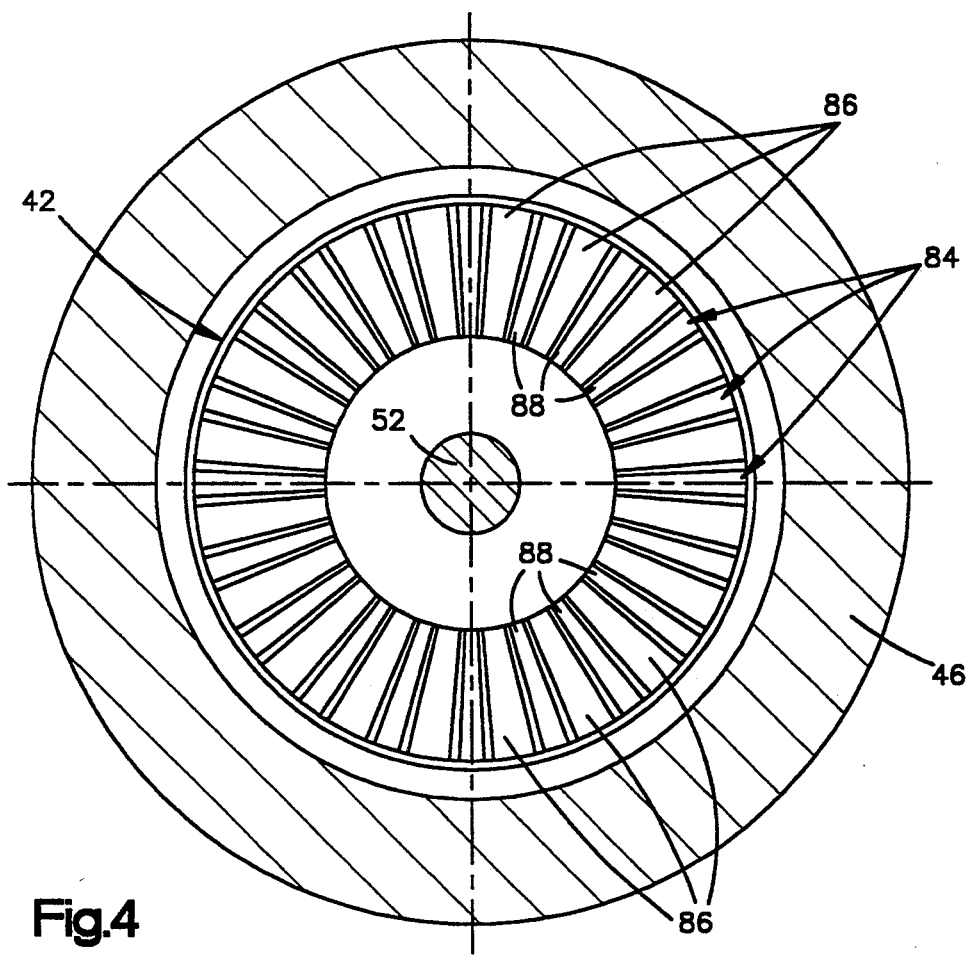
FIG. 4 is a sectional view, taken generally along the line 4—4 of FIG. 2.

An inner annular array 92 of identical cam surfaces 94 is formed on an annular contour washer 98 (FIGS. 3 and 5). The cylindrical cam surfaces 94 in the annular array 92 are separated by flat radially extending lands 96 (FIG. 5). The cam surfaces 94 (FIG. 5) have the same configuration as the cam surfaces 86 (FIG. 4).

Figure 2:
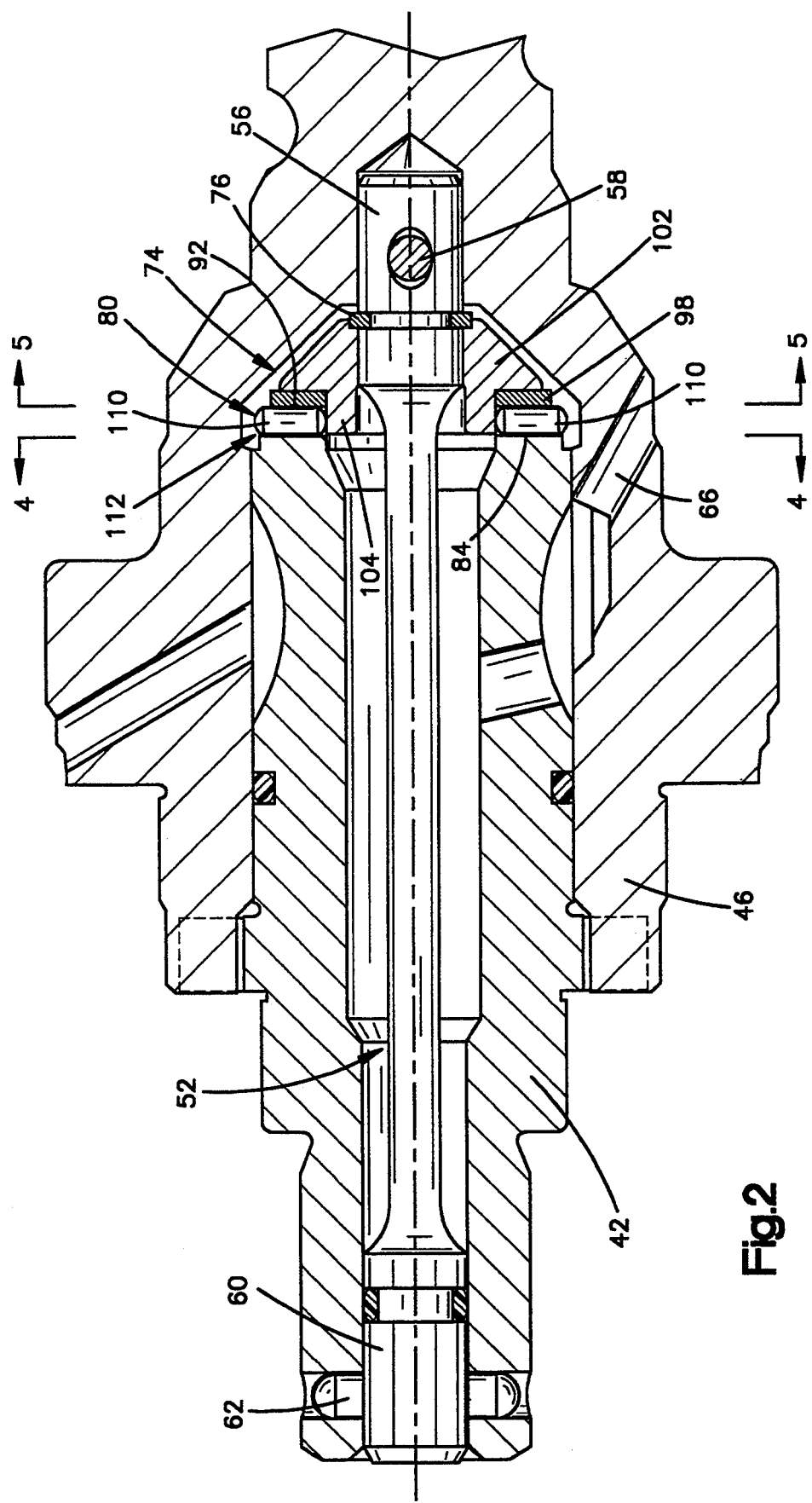
FIG. 2 is an enlarged fragmentary sectional view of a portion of the power steering system of FIG. 1.

The contour washer 98 is fixedly secured to a rigid annular metal support ring 102 (FIG. 2 and 3). Thus, the support ring 102 has a cylindrical central portion 104 (FIG. 2) which has an interference fit with the inside diameter of the contour washer 98. The inner support ring 102 also has an interference fit with the cylindrical end portion 56 of the torsion-tension spring 52. The axially inner end of the support ring 102 is disposed in abutting engagement with the annular clip 76.

Force is transmitted from the support ring 102 to the inner end portion 56 of the torsion-tension spring 52 by the interference fit between the support ring and the inner end portion of the torsion-tension spring. In addition, force is transmitted from the support ring 102 to the inner end portion of the torsion-tension spring 52 by the clip 76. The thrust bearing assembly 80 (FIGS. 2 and 6) includes a plurality of cylindrical rollers 110 which are disposed in an annular array 112. The rollers 110 are held in an evenly spaced relationship by an annular retainer ring 114 (FIG. 6). Although the thrust bearing assembly 80 could have many different constructions, in one specific embodiment of the invention, the thrust bearing assembly 80 was an INA TC-1018 thrust bearing.

The number of rollers 110 in the thrust bearing assembly 80 is equal to the number of cam surfaces in the annular array 84 (FIG. 4) of cam surfaces 86 and the number of cam surfaces in the annular array 92 (FIG. 5) of cam surfaces 94. A cam surface 86 in the array 84 of cam surfaces and a cam surface 94 in the array 92 of cam surfaces abuttingly engage opposite sides of each of the rollers 110. The retainer 114 (FIG. 6) spans the lands 88 between the cam surfaces 86 and the lands 96 between the cam surfaces 94 to interconnect the rollers 110. In one specific embodiment of the invention, the thrust bearing assembly 80 included twenty rollers 110 which engage twenty cam surfaces 86 in the array 84 of cam surfaces and twenty cam surfaces 94 in the array 92 of cam surfaces.

Figure 7:
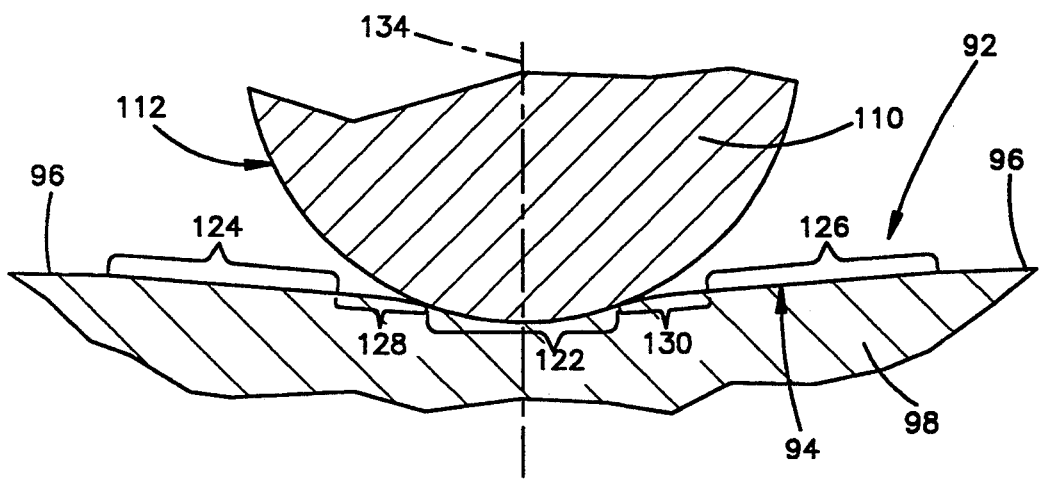
FIG. 7 is an enlarged fragmentary sectional view of a portion of a roller in the thrust bearing assembly of FIG. 6 and a portion of a cam surface.

The relationship between one of the rollers 110 and a cam surface 94 in the array 92 of cam surfaces is illustrated in FIG. 7. The cam surface 94 has a central trough or depression 122 upon which a roller 110 rests when the annular array 112 of rollers is in an on-center position corresponding to straight ahead movement of a vehicle. The cam surface 94 has a pair of side portions 124 and 126 which slope gradually upwardly (as viewed in FIG. 7) to the lands 96. The side portions 124 and 126 are connected with the trough 122 by transition portions 128 and 130.

The trough 122 has relatively steep side surfaces. The side portions 124 and 126 of the cam surface 94 have a much more gradual upward slope. The steeply sloping side surfaces of the trough 122 are connected with the gently sloping side portions 124 and 126 by transition portions 128 and 130. A central axis 134 of the cam surface 94 is disposed midway between intersections of the side portions 124 and 126 with the lands 96. When the steering system is in the on-center condition, the central axis of roller 110 is disposed on the central axis 134 of the cam surface 94.

In one specific embodiment of the invention, a portion of the cam surface 94 to one side of the axis 134, for example, the right side as view in FIG. 7, was constructed in accordance with Chart I (Page 12). It should be understood that the construction of the cam surface 94 is the same on both sides of the center line 134. In Chart I, the angle is measured from a first or base radian 138 (FIG. 5) which extends through the center of the cam surface 94 and intersects the vertical (as viewed in FIG. 7) axis 134. The angle is measured to a second radian 140 (FIG. 5). The angle is indicated at 142 in FIG. 5.

The angle 142 is considered to be 0° when both of the radians 138 and 140 (FIG. 5) extend through the center of the cam surface 94. As the angle increases in a counterclockwise direction (as viewed in FIG. 5), the radian 140 separates more and more from the radian 138 and the angle 142 becomes larger.

In Chart I (Page 12), the depth of the cam surface is considered to be the vertical (as viewed in FIG. 7) distance from the land surface 96 to the intersection of the radian 140 with the cam surface 94. Thus, the depth of the cam surface 94 is measured vertically downwardly (as viewed in FIG. 7) from the land 96 to the level where the radian 140 intersects the cam surface 94.

When the angle 142 (FIG. 5) is 0°, the depth of the cam surface 94 in the specific embodiment of the invention corresponding to Chart I, is 0.00200 inches. When the angle 142 is increased to 1°, the depth of the cam surface 94 is 0.00161 inches. Similarly, when the angle 142 (FIG. 5) has increased to 2° the depth of the cam surface 94 is 0.00136. The cam surface 94 has a configuration such that it is generated by radians from the center of the array 92 of cam surfaces. Thus, radians from the center of the array 92 of cam surfaces are tangent to cam surfaces 94 throughout the extent of the cam surfaces.

CHART I

| ANGLE | DEPTH |
|-------|---------|
| 0.00  | 0.00200 |
| 0.25  | 0.00183 |
| 0.50  | 0.00172 |
| 0.75  | 0.00166 |
| 1.00  | 0.00161 |
| 1.25  | 0.00155 |
| 1.50  | 0.00149 |
| 1.75  | 0.00142 |
| 2.00  | 0.00136 |
| 2.25  | 0.00129 |
| 2.50  | 0.00122 |
| 2.75  | 0.00115 |
| 3.00  | 0.00109 |
| 3.25  | 0.00102 |
| 3.50  | 0.00096 |
| 3.75  | 0.00090 |
| 4.00  | 0.00084 |
| 4.25  | 0.00078 |
| 4.50  | 0.00073 |
| 4.75  | 0.00067 |
| 5.00  | 0.00062 |
| 5.25  | 0.00057 |
| 5.50  | 0.00052 |
| 5.75  | 0.00047 |
| 6.00  | 0.00042 |

The extent to which the cam surface 94 rises (as viewed in FIG. 7) with each increment of the angle 142 varies. Thus, for each increment that the angle 142 increases close to the center of the cam surface 94, that is, in the area of the trough 122, there is a relatively large decrease in the depth of the cam surface. At the gently sloping outer portion 126 of the cam surface 94, there is a relatively small change in the depth of the recess 94 with each incremental increase in the angle 142. In the transition portion 130, the depth of the cam surface changes at a decreasing rate with each incremental increase in the angle 142.

The cam surfaces 86 and 94 in the two arrays 84 and 92 (FIGS. 4 and 5) of cam surfaces have the same configuration. A roller 110 engages one of the cam surfaces 86 in the array 84 of cam surfaces and one of the cam surfaces 94 in the array 92 of cam surfaces. Therefore, each incremental increase in the angle 142 results in arrays 84 and 92 of cam surfaces moving apart by a distance which is twice as great as the distance indicated in Chart I. For example, if the angle 142 increases from one degree to two degrees, the arrays 84 and 92 of cam surfaces move apart by a distance of 0.00050 inches or twice the 0.00025 inch change in the depth of one of the recesses.

The array 84 of cam surfaces is connected with the outer end portion 60 of the torsion-tension spring by the rigid valve core 42 and pin 62. The inner array 92 of cam surfaces is connected with the inner end portion 56 of the torsion-tension spring by the rigid support ring 102 and clip 76. Therefore, the length of the torsion-tension spring 52 resiliently increases as the arrays 84 and 82 of cam surfaces move apart.

As a roller 110 (FIG. 7) rolls along the cam surface 94, the slope of the portion of the cam surface engaged by the roller changes. Thus, when the roller 110 is in the on-center position corresponding to straight-ahead movement of a vehicle, the roller engages the relatively steeply sloping side surfaces of the trough 122. As the roller 110 is displaced from the on-center position, for example, toward the right as viewed in FIG. 7, the roller moves into engagement with the more gently sloping transition portion 130 of the cam surface 94. As the slope of the portion of the cam surface engaged by the roller changes, the line along which the cam surface engages the roller also changes.

Figure 8:
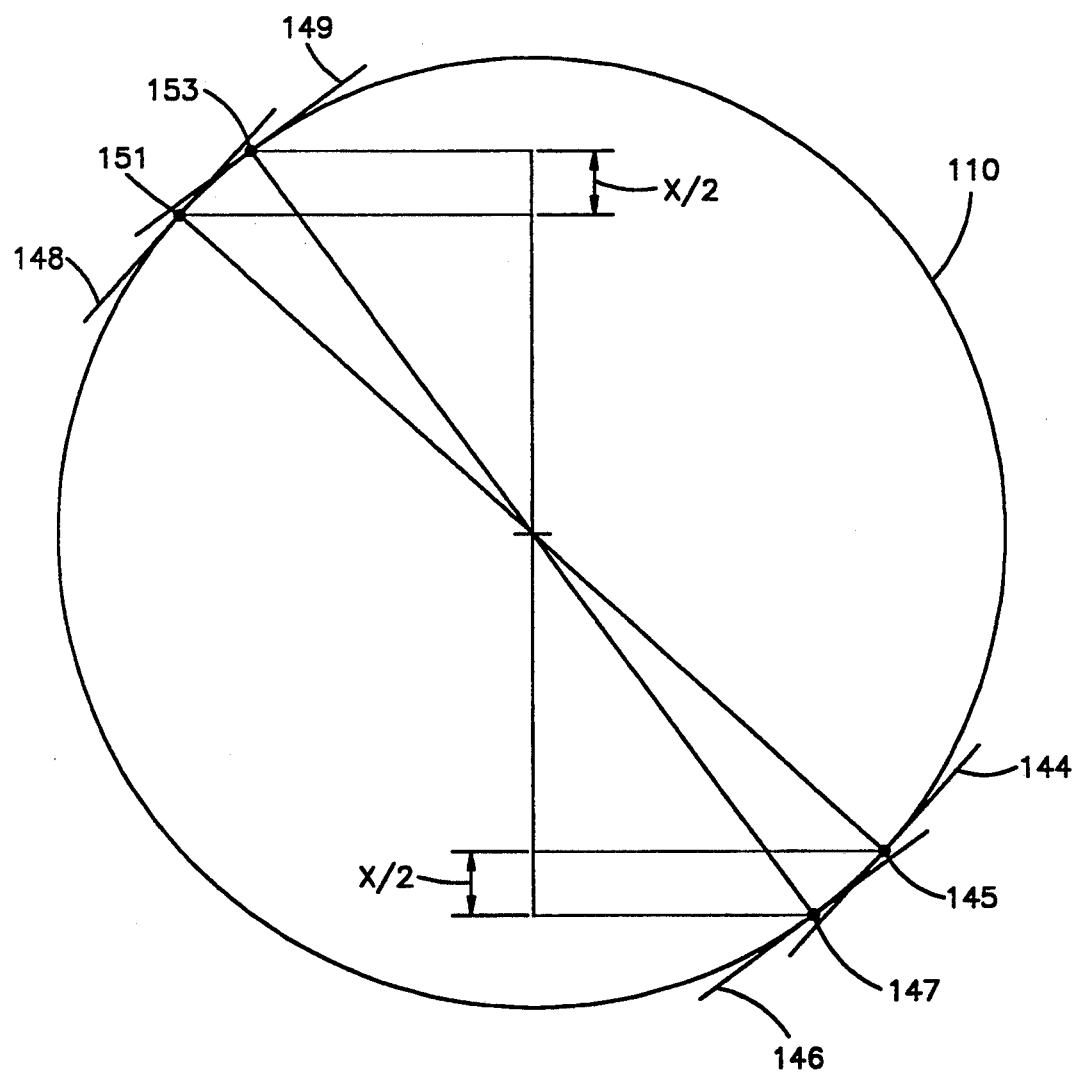
FIG. 8 is a highly schematicized illustration depicting the manner in which lines of engagement of a bearing with the cam surface changes due to changing slope of the cam surface.

When the roller 110 (FIG. 8) is in engagement with a relatively steeply sloping portion, indicated schematically at 144 in FIG. 8, of the cam surface 94, the roller will have a first line 145 of engagement with the cam surface 94. When the roller 110 moves upwardly (as viewed in FIGS. 7 and 8) into engagement with a less steeply sloping portion 146 of the cam surface 94, the roller will have a second line 147 of engagement with the cam surface 94. It should be understood that the change in the slope of the portions 144 and 146 of the cam surface 94 has been exaggerated for purposes of clarity of illustration in FIG. 8 and is greater than would actually occur.

Since the cam surfaces 94 and 86 have the same configuration, the slope of the cam surface 86 will change from the slope indicated by the line 148 in FIG. 8 to the slope indicated by the line 149. This results in the line of engagement of the roller 110 with the cam surface 86 changing from the line indicated at 151 in FIG. 8 to the line indicated at 153 in FIG. 8.

The radial distance which the line of engagement of the cam surface 94 with the roller 110 moves radially outwardly (downwardly as viewed in FIG. 8), when the slope changes from the line indicated at 144 to the line indicated at 146, has been designated as the distance X/2 in FIG. 8. Similarly, the radial distance which the line of engagement of the cam surface 86 with the roller 110 moves radially outwardly (upwardly as viewed in FIG. 8), when the slope changes from the line indicated at 148 to the line indicated at 149, has also been designated as the distance X/2. Thus, the combined radial distance which the lines of engagement of the roller 110 with the cam surfaces 86 and 94 change is equal to X.

The extent to which the line of engagement of the roller 110 with the cam surfaces 86 and 94 changes, that is, the distance X, is set forth in Chart II (Page 16) for each increment of the angle 142 (FIG. 5). For each increment that the angle 142 changes, the elongation of the torsion-tension spring 52 changes by an amount which is equal to the sum of the change due to variations in the depth of the cam surfaces 86 and 94 and variations in the line of engagement of the cam surfaces with the surface of the rollers 110.

If the angle 142 increases from one degree to two degrees, the change in the axial length of the torsion-tension spring results from the change in the depth of the cam surface 86, the change in the depth of the cam surface 94 and the change in the lines of engagement of the rollers 110 with the cam surfaces. For example, if the angle 142 increases from one degree to two degrees, the arrays 84 and 92 of cam surfaces move apart by a distance of 0.00050 inches or twice the 0.00025 inch depth change in one of the cam surfaces. In addition, the arrays of cam surfaces move apart by a distance equal to the sum of the distances X set forth in Chart II or 0.00037 inches (0.00014+0.00010+0.00007+0.00006). This results in the total axial elongation of the torsion-tension spring 52 being 0.00087 inches as a result of a change in the angle 142 from one degree to two degrees.

| CHART II | |
| --- | --- |
| ANGLE | DEPTH |
| 0.000 | |
| 0.25 | |
| 0.50 | 0.00011 |
| 0.75 | 0.00020 |
| 1.00 | 0.00018 |
| 1.25 | 0.00014 |
| 1.50 | 0.00010 |
| 1.75 | 0.00007 |
| 2.00 | 0.00006 |
| 2.25 | 0.00005 |
| 2.50 | 0.00004 |
| 2.75 | 0.00003 |
| 3.00 | 0.00003 |
| 3.25 | 0.00002 |
| 3.50 | 0.00002 |
| 3.75 | 0.00002 |
| 4.00 | 0.00001 |
| 4.25 | 0.00001 |
| 4.50 | 0.00001 |
| 4.75 | 0.00001 |
| 5.00 | 0.00001 |
| 5.25 | 0.00001 |
| 5.50 | 0.00001 |
| 5.75 | 0.00001 |
| 6.00 | 0.00001 |

Operation

When a vehicle is moving straight ahead, the annular arrays 84 and 92 of cam surfaces 86 and 94 are axially aligned with each other. At this time, the rollers 110 engage troughs 122 in the cam surfaces 86 and 94. The torsion-tension spring 52 is axially strained in tension by a preload force. This results in the torsion-tension spring 52 pressing the cam surfaces 86 and 94 against opposite sides of the thrust bearing assembly 80.

Until the vehicle steering wheel is rotated, the initial preload force causes the valve core 42 and valve sleeve 46 to remain in an on-center position in which the power steering motor 12 is inactive. Upon initiation of a turning maneuver, the input shaft 44 and valve core 42 rotate relative to the valve sleeve 46.

Relative rotation between the valve core 42 and valve sleeve 46 ports pressure fluid to either the left end portion 22 or the right end portion 24 of the power steering motor chamber 18. The other chamber of the power steering motor is connected with reservoir. This results in turning movement of the steerable vehicle wheels.

As the valve core 42 rotates relative to the valve sleeve 46, the inner and outer arrays 84 and 92 of cam surfaces are offset relative to each other. Thus, the angle 142 (FIG. 5) increases. As the angle 142 increases, the roller 110 (FIG. 7) rolls along the cam surface 94 away from the trough 122, for example, toward the right (as viewed in FIG. 7).

The portion of the cam surface 94 forming the trough 122 has a relatively steep slope so that there is a relatively large change in the depth of the cam surface 94 for each increment of relative movement between the valve core 42 and valve sleeve 46. Thus, as the angle 142 increases from zero degrees to one degree of angle, the depth of the portion of the cam surface 94 engaged by the roller decreases from 0.00200 inches to 0.00161 inches (see Chart I). In addition, the depth of the cam surface 86 which engages the opposite side of the roller also decreases from 0.00200 inches to 0.00161 inches. This results in a total change of 0.00078 inches in the cam surfaces.

As the rollers 110 roll along the cam surfaces 86 and 94, the line of engagement of the rollers with the cam surfaces changes in an axial direction relative to the arrays 84 and 92 of cam surfaces by amounts indicated at X in Chart II. Thus, as the angle 142 increases from zero degrees to one degree of angle, the axial change in the point of engagement of the rollers will shift by 0.00049 inches (0.00011+0.00020+0.00018). The combined or total change in the length of the torsion-tension spring 52 is the sum of the changes due to the change in depth of the cam surfaces 86 and 94 and the change in the, lines of engagement of the rollers 110 with the cam surfaces. Thus, the total change in the axial extent of the torsion-tension spring 52 will be 0.00078 plus 0.00049 inches or 0.00127 inches. Since opposite end portions 56 and 60 of the torsion-tension spring 52 are connected with the arrays 84 and 92 of cam surfaces by rigid metal members, the tensile forces to which the torsion-tension spring 52 is subjected resiliently strains the torsion-tension spring to elastically increase its length by the same amount, that is, by 0.00127 inches.

As the relative rotation between the valve core 42 and valve sleeve 46 continues, the slope of the cam surfaces 86 and 94 engaged by the rollers 110 of the thrust bearing 80 decreases. Therefore, for equal increments of relative rotation between the valve core 42 and valve sleeve 46, the extent of resilient axial deformation of the torsion-tension spring decreases as the relative rotation between the valve core 42 and valve sleeve 46 increases.

Figure 9:
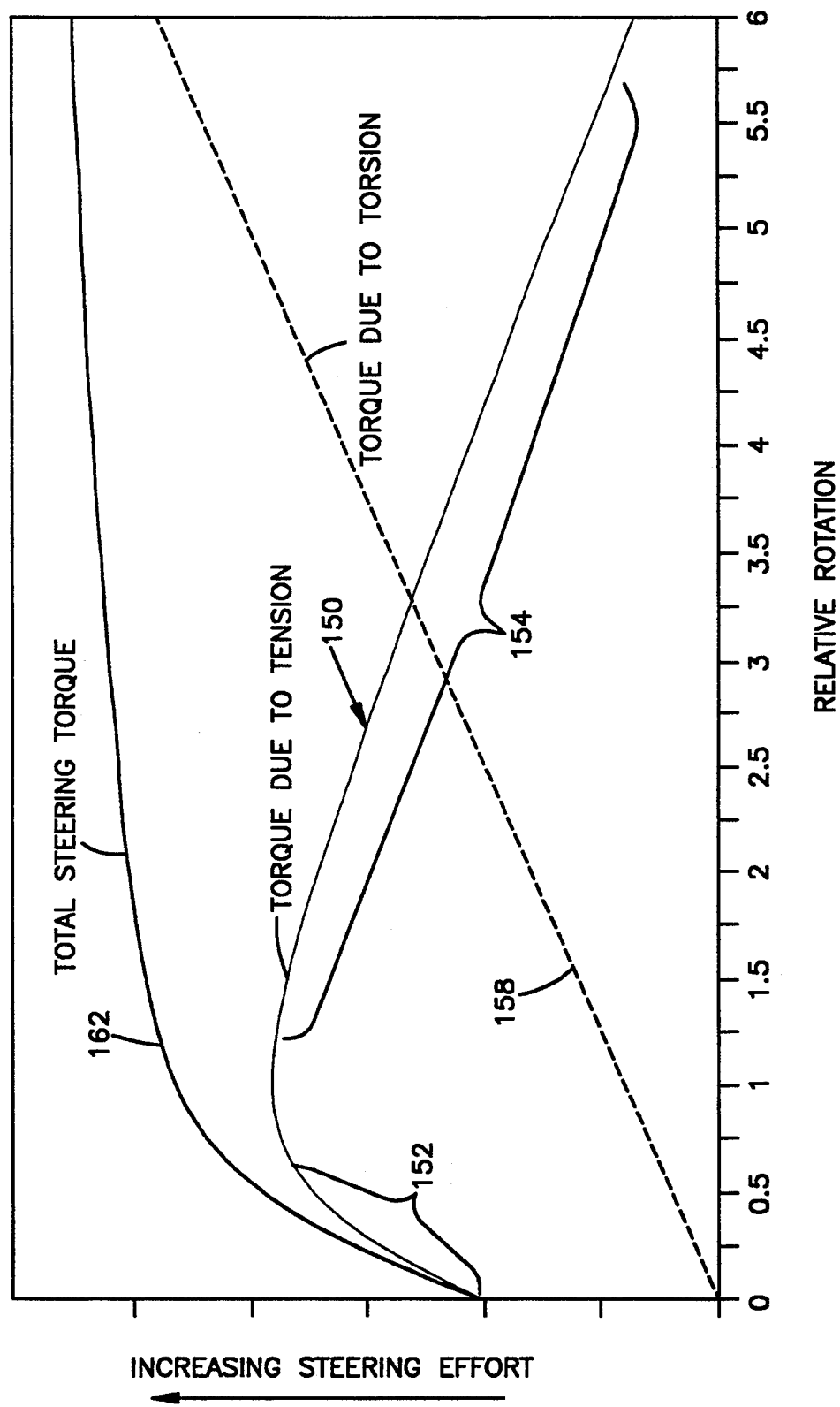
FIG. 9 is a graph illustrating the manner in which steering effort varies.

Decreasing the extent of axial elongation of the torsion-tension spring 52, during succeeding increments of relative rotation between the valve core 42 and valve sleeve 46, decreases the amount of force which is required to effect each succeeding increment of rotation of the valve core due to elastic tensile deformation of the torsion-tension spring. This is shown by curve 150 in FIG. 9. As the steering wheel is turned away from the initial position, the steeply sloped portions of the cam surfaces 86 and 94 adjacent to the troughs 122 results in a relatively large rate of increase in the resistance to relative rotation between the valve core 42 and valve sleeve 46. This is indicated by the relatively steep slope of the portion 152 of the curve 150 (FIG. 9).

As the extent of relative rotation between the valve core 42 and sleeve 46 increases, the slope of the portion of the outer and inner cam surfaces 86 and 94 engaged by the rollers 110 decreases. Therefore, the amount of resistance encountered during each additional increment of relative rotation between the valve core 42 and valve sleeve 46 decreases. This is indicated by the portion of the curve 150 indicated at 154 in FIG. 9. This is because the extent of resilient axial elongation of the torsion-tension spring 52 with each incremental increase in relative rotation between the valve core 42 and valve sleeve 46 results in a smaller amount of axial elongation of the torsion-tension spring 52. Therefore, even though the total elastic axial elongation of the torsion-tension spring 52 and the total axial stress in the torsion-tension spring increases with each increment of relative rotation between the valve core 42 and valve sleeve 46, the resistance to each additional increment of relative rotation decreases in the manner shown by the portion 154 if the curve 150.

In addition to axial elongation due to the application of tensile forces to the torsion-tension spring 52, the torsion-tension spring is elastically deformed by torsional forces as the valve core 42 and valve sleeve 46 are rotated relative to each other. Thus, the inner end portion 56 of the torsion-tension spring 52 is secured to the valve sleeve 46 and the outer end portion 60 of the torsion-tension spring is fixedly secured to the valve core 42. Relative rotation between the valve core 42 and valve sleeve 46 results in elastic torsional strain or deformation of the torsion-tension spring 52 in a known manner.

The extent of the torsional deformation of the torsion-tension spring 52 remains constant with each increment of relative rotation between the valve core 42 and valve sleeve 46. Therefore, the resistance due to torsion increases in a linear manner, as shown by the curve 158 in FIG. 9.

The total resistance encountered to providing relative rotation between the valve core 42 and valve sleeve 46 is the sum of the resistance provided by the resilient tensile deformation of the torsion-tension spring and the resilient torsional deformation of the torsion-tension spring. This results in the total resistance to relative rotation between the valve core 42 and valve sleeve 46 increasing in the manner indicated by the curve 162 during relative rotation between the valve core 42 and valve sleeve 46.

During a parking maneuver, the extent of relative rotation between the valve core 42 and valve sleeve 46 might typically be slightly in excess of three degrees. During a lane change at 55 miles per hour, the extent of relative rotation between the valve core 42 and valve sleeve 46 might typically be about 2.2 degrees. After approximately, 1.5 degrees of relative rotation between the valve core 42 and valve sleeve 46, the decreasing resistance due to tensile deformation of the torsion-tension spring 52 partially offsets the increasing resistance due to torsional deformation of the torsion-tension spring.

From the above description of the invention, those skilled in the art will perceive improvements, changes and modifications to the invention. Such improvements, changes and modifications within the skill of the art are intended to be covered by the appended claims.

Having described the invention, the following is claimed:

1. An apparatus for use in a power steering system, said apparatus comprising:
   first and second members which are rotatable relative to each other to control operation of a power steering motor,
   a torsion-tension spring interconnecting said first and second members,
   means for applying torque to said torsion-tension spring to effect increasing torsional deformation of said torsion-tension spring upon relative rotation between said members in a first direction, and
   means for applying tensile force to said torsion-tension spring to effect increasing axial deformation of said torsion-tension spring upon relative rotation between said members in the first direction, said means for applying tensile force to said torsion-tension spring including means for varying the tension applied to the torsion-tension spring by a first amount upon relative rotation between said members in a first direction through a first incremental angular distance and for varying the tension applied to said torsion-tension spring by a second amount which is different than the first amount upon relative rotation between said members in the first direction through a second incremental angular distance which is the same as and is offset from the first incremental angular distance,
   said means for applying tensile force to said torsion-tension spring includes cam surface means for transmitting force to effect axial deformation of said torsion-tension spring, said cam surface means having a first portion which has a first slope and a second portion which has a second slope which is less than said first slope, said first portion of said cam surface means being effective to apply tensile force to said torsion-tension spring during relative rotation between said members through the first incremental angular distance, said second portion of said cam surface means being effective to apply tensile force to the torsion-tension spring during relative rotation between said members through the second incremental distance.

2. An apparatus as set forth in claim 1 wherein said means for applying tensile force to said torsion-tension spring includes an annular array of rollers, said cam surface means including a first annular array of cam surfaces disposed in engagement with a first side of said annular array of rollers and a second annular array of cam surfaces disposed in engagement with a second side of said annular array of rollers.

3. An apparatus as set forth in claim 1 wherein said first and second members are first and second valve members which cooperate to control a flow of fluid to the power steering motor, said means for applying tensile force to said torsion-tension spring includes an annular array of rollers having an open central portion through which said torsion-tension spring extends, said cam surface means including a first annular array of cam surfaces fixedly connected with one end portion of said first valve member and disposed in engagement with a first side of said annular array of rollers and a second annular array of cam surfaces fixedly connected with said second valve member and disposed in engagement with a second side of said annular array of rollers.

4. An apparatus as set forth in claim 1 wherein said first and second members are rotatable relative to each other in opposite directions from an initial position, said means for applying torque to said torsion-tension spring including means for increasing torsional deformation of said torsion-tension spring upon relative rotation between said members in a first direction from the initial position and for increasing torsional deformation of said torsion-tension spring upon relative rotation between said members in a second direction opposite to the first direction, said means for applying tensile force to said torsion-tension spring including means cooperating with said cam surface means for maintaining said torsion-tension spring in an axially deformed condition under the influence of tensile force when said members are in the initial position to enable said torsion-tension spring to provide a force which biases said first and second members to the initial position.

5. An apparatus as set forth in claim 1 wherein said torsion-tension spring has first and second end portions, said first member being fixedly connected with said first end portion of said torsion-tension spring, said second member being fixedly connected with said second end portion of said torsion-tension spring, said means for applying tensile force to said torsion-tension spring being disposed between said first and second end portions of said torsion-tension spring and being connected with said first and second end portions of said torsion-tension spring by rigid bodies which transmit tensile forces between said first and second end portions of said torsion-tension spring and said means for applying tensile force without significant deformation.

6. An apparatus for use in a power steering system, said apparatus comprising:
first and second members which are rotatable relative to each other to control operation of a power steering motor,
a torsion-tension spring interconnecting said first and second members,
means for applying torque to said torsion-tension spring to effect increasing torsional deformation of said torsion-tension spring upon relative rotation between said members in a first direction, and
means for applying tensile force to said torsion-tension spring to effect increasing axial deformation of said torsion-tension spring upon relative rotation between said members in the first direction, said means for applying tensile force to said torsion-tension spring including means for decreasing the extent of axial deformation of said torsion-tension spring during each increment of a plurality of equal increments of relative rotation between said first and second members in the first direction,
said means for applying tensile force to said torsion-tension spring includes cam surface means for transmitting force to effect axial deformation of said torsion-tension spring, said cam surface means having a first portion which is fixedly connected with one of said members and has a first slope, said cam surface means having a second portion which is fixedly connected with said one of said members and has a second slope which is less than said first slope, said first portion of said cam surface means being effective to apply tensile force to said torsion-tension spring during a first one of the plurality of equal increments of relative rotation between said first and second members, said second portion of said cam surface means being effective to apply tensile force to the torsion-tension spring during a second one of the plurality of equal increments of relative rotation between said first and second members, said first one of the plurality of equal increments of relative rotation preceding said second one of the plurality of increments of relative rotation during relative rotation between the first and second members in the first direction.

7. An apparatus as set forth in claim 6 wherein said means for applying tensile force to said torsion-tension spring includes an annular array of rollers, a first annular array of cam surfaces disposed in engagement with a first side of said annular array of rollers, a second annular array of cam surfaces disposed in engagement with a second side of said annular array of rollers, and means for maintaining a constant spatial relationship between rollers of said annular array of rollers during relative rotation between said first and second members.

8. An apparatus as set forth in claim 6 wherein said first and second members are first and second valve members which cooperate to control a flow of fluid to the power steering motor, said means for applying tensile force to said torsion-tension spring includes an annular array of rollers having an open central portion through which said torsion-tension spring extends, means for maintaining the size of said annular array of rollers constant during relative rotation between said first and second members, a first annular array of cam surfaces fixedly connected with one end portion of said first valve member and disposed in engagement with a first side of said annular array of rollers, and a second annular array of cam surfaces fixedly connected with said second valve member and disposed in engagement with a second side of said annular array of rollers.

9. An apparatus for use in a power steering system, said apparatus comprising:
first and second members which are rotatable relative to each other to control operation of a power steering motor,
a torsion-tension spring interconnecting said first and second members,
means for applying torque to said torsion-tension spring to effect increasing torsional deformation of said torsion-tension spring upon relative rotation between said members in a first direction, and
means for applying tensile force to said torsion-tension spring to effect increasing axial deformation of said torsion-tension spring upon relative rotation between said members in the first direction, said means for applying tensile force to said torsion-tension spring including a first cam surface which is fixedly connected with a first end portion of said torsion-tension spring and a second cam surface which is fixedly connected with a second end portion of said torsion-tension spring,
said means for applying tensile force to said torsion-tension spring includes a plurality of members which are disposed between said first and second cam surfaces and which apply force against said first and second cam surfaces to increase the distance between said first and second cam surfaces upon relative rotation between said first and second members in the first direction, said torsion-tension spring being deformed in tension in an axial direction by an amount which is the same as the increase in the distance between said first and second cam surfaces upon relative rotation between said first and second members in the first direction.

10. An apparatus set forth in claim 9 wherein said first and second members are first and second valve members which cooperate to control a flow of fluid to the power steering motor, said first cam surface being fixedly connected with said first valve member and said second cam surface being fixedly connected with said second valve member.

11. An apparatus as set forth in claim 9 further including means for maintaining the spatial relationship between members of said plurality of members constant during relative rotation between said first and second members.

12. An apparatus as set forth in claim 9 wherein each of the members of said plurality of members is a roller having a cylindrical side surface which is disposed in abutting engagement with said first and second cam surfaces, each of said rollers having a longitudinal central axis which extends transversely to a longitudinal central axis of said torsion-tension spring.

13. An apparatus for use in a power steering system, said apparatus comprising:
first and second members which are rotatable relative to each other to control operation of a power steering motor,
a torsion-tension spring interconnecting said first and second members,
means for applying torque to said torsion-tension spring to effect increasing torsional deformation of said torsion-tension spring upon relative rotation between said members in a first direction, and
means for applying tensile force to said torsion-tension spring to effect increasing axial deformation of said torsion-tension spring upon relative rotation between said members in the first direction, said means for applying tensile force to said torsion-tension spring includes an annular array of rollers, a first annular array of cam surfaces disposed in engagement with a first side of said annular array of rollers, a second annular array of cam surfaces disposed in engagement with a second side of said annular array of rollers, and means for maintaining a constant spatial relationship between rollers of said annular array of rollers during relative rotation between said first and second members.

14. An apparatus as set forth in claim 13 wherein each of the rollers of said annular array of rollers has a cylindrical outer side surface which applies force against said first and second annular arrays of cam surfaces to increase the distance between said first and second annular arrays of cam surfaces in an axial direction, said torsion-tension spring being deformed in tension and an axial direction by an amount which is the same as the increase in the distance between said first and second annular arrays of cam surfaces upon relative rotation between said first and second members.

* * * * *